(12) United States Patent
Morris

(10) Patent No.: US 10,594,126 B2
(45) Date of Patent: Mar. 17, 2020

(54) PROCESS FOR FORMING A DIVIDED CONDUIT

(71) Applicant: Milliken & Company, Spartanburg, SC (US)

(72) Inventor: David Drew Morris, Newnan, GA (US)

(73) Assignee: Milliken & Company, Spartanburg, SC (US)

( * ) Notice: Subject to any disclaimer, the term of this patent is extended or adjusted under 35 U.S.C. 154(b) by 250 days.

(21) Appl. No.: 15/653,885

(22) Filed: Jul. 19, 2017

(65) Prior Publication Data
US 2018/0026431 A1 Jan. 25, 2018

Related U.S. Application Data

(60) Provisional application No. 62/364,626, filed on Jul. 20, 2016.

(51) Int. Cl.
*H02G 9/06* (2006.01)
*B29C 48/11* (2019.01)
(Continued)

(52) U.S. Cl.
CPC ............ *H02G 9/065* (2013.01); *B29C 48/11* (2019.02); *B29C 48/30* (2019.02); *B29C 48/303* (2019.02);
(Continued)

(58) Field of Classification Search
CPC ........ H02G 9/065; H02G 1/08; H02G 3/0468; H02G 3/0481; B29C 48/11; B29C 48/30;
(Continued)

(56) References Cited

U.S. PATENT DOCUMENTS

| 3,110,754 A | 11/1963 | Witort et al. ................ 174/70 |
| 3,860,686 A | 1/1975 | Myers .......................... 264/174 |

(Continued)

FOREIGN PATENT DOCUMENTS

| KR | 2008-0020828 | 3/2008 |
| WO | WO 1991/08098 | 6/1991 |

OTHER PUBLICATIONS

Patent Cooperation Treaty PCT International Search Report, dated Sep. 4, 2013. International Application No. PCT/US2013/040124. International Filing Date, May 8, 2013.
(Continued)

*Primary Examiner* — Jeffrey M Wollschlager
(74) *Attorney, Agent, or Firm* — Cheryl J. Brickey

(57) ABSTRACT

A process for extruding a divided conduit comprising obtaining an extrusion die head, inserting a strip-shaped substrate into the extrusion die head such that the strip shaped substrate is located within the tip gap and extends at least partially out of the tip gap such that the longitudinal edges are located in the die gap, and flowing molten polymer through die gap, encapsulating the longitudinal edges of the strip-shaped substrate in molten polymer. The extrusion die head contains a tip region and a bushing. The tip region contains at least 2 tips separated by a tip gap. The bushing extends around the tip region and the distance between the tip region and the inner surface of the bushing is defined to be the die gap and the die gap varies around the bushing.

9 Claims, 6 Drawing Sheets

(51) Int. Cl.
  *B29C 48/30* (2019.01)
  *B29C 48/34* (2019.01)
  *H02G 1/08* (2006.01)
  *H02G 3/04* (2006.01)
  *B29C 48/285* (2019.01)
  *B29C 48/32* (2019.01)
  *B29C 48/16* (2019.01)

(52) U.S. Cl.
  CPC .............. *B29C 48/34* (2019.02); *H02G 1/08* (2013.01); *H02G 3/0468* (2013.01); *H02G 3/0481* (2013.01); *B29C 48/16* (2019.02); *B29C 48/2883* (2019.02); *B29C 48/3001* (2019.02); *B29C 48/32* (2019.02)

(58) Field of Classification Search
  CPC ....... B29C 48/303; B29C 48/34; B29C 48/16; B29C 48/3001; B29C 48/2883; B29C 48/32
  See application file for complete search history.

(56) References Cited

U.S. PATENT DOCUMENTS

| | | | | |
|---|---|---|---|---|
| 4,061,461 A | | 12/1977 | Hessenthaler | ................ 425/462 |
| 4,465,449 A | * | 8/1984 | Hornbeck | ............... B29C 44/22 425/131.1 |
| 4,751,651 A | * | 6/1988 | Bryan | ..................... B29C 48/32 700/197 |
| 5,374,245 A | * | 12/1994 | Mahurkar | ........... A61M 25/001 604/43 |
| 5,587,115 A | | 12/1996 | Allen | ............................ 264/1.24 |
| 6,004,489 A | * | 12/1999 | Huang | .................... B21C 25/02 264/176.1 |
| 6,106,647 A | | 8/2000 | Yamagiwa et al. | .............. 156/87 |
| 6,769,899 B2 | * | 8/2004 | Groeblacher | ........... B29C 48/30 425/381 |
| 2013/0300024 A1 | | 11/2013 | Morris | ....................... 264/209.1 |
| 2015/0084229 A1 | | 3/2015 | Morris | ..................... 264/171.26 |

OTHER PUBLICATIONS

Patent Cooperation Treaty PCT International Search Report, dated Sep. 4, 2013. International Application No. PCT/US2013040121. International Filing Date, May 8, 2013.

Patent Cooperation Treaty PCT International Search Report, dated Oct. 18, 2017. International Application No. PCT/US2017/042835. International Filing Date, Jul. 19, 2017.

\* cited by examiner

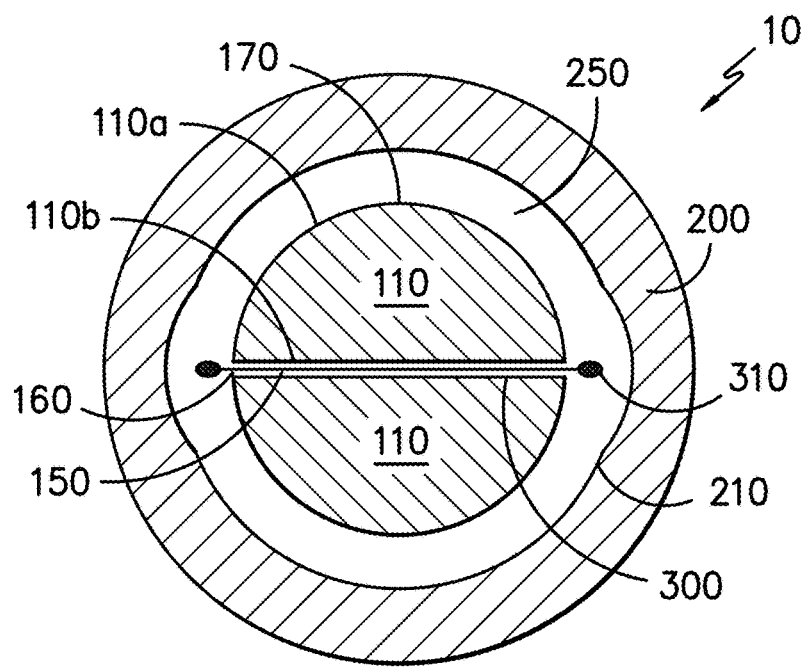
FIG. -1-
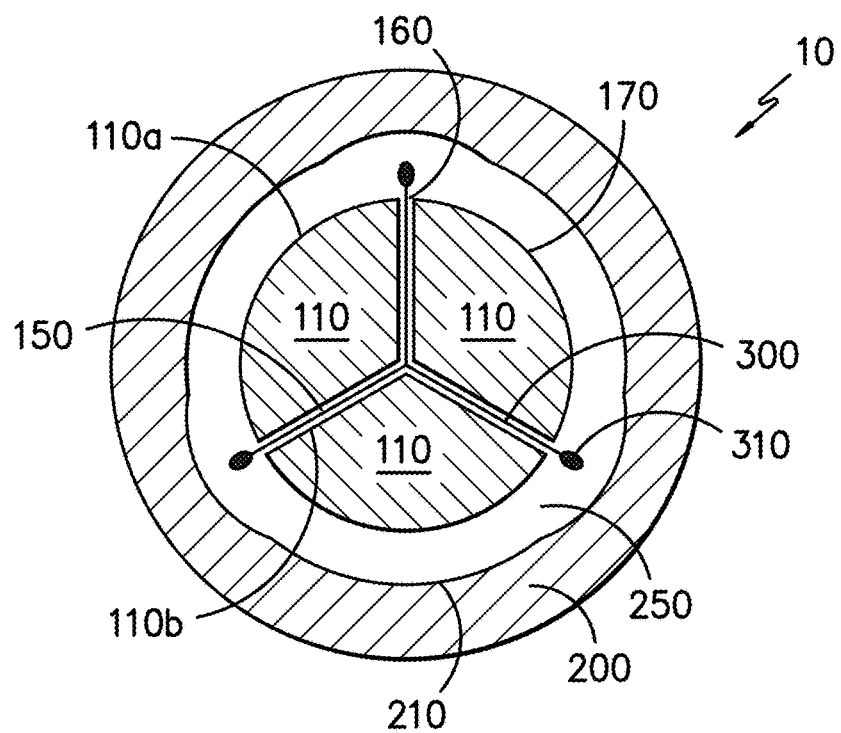
FIG. -2-

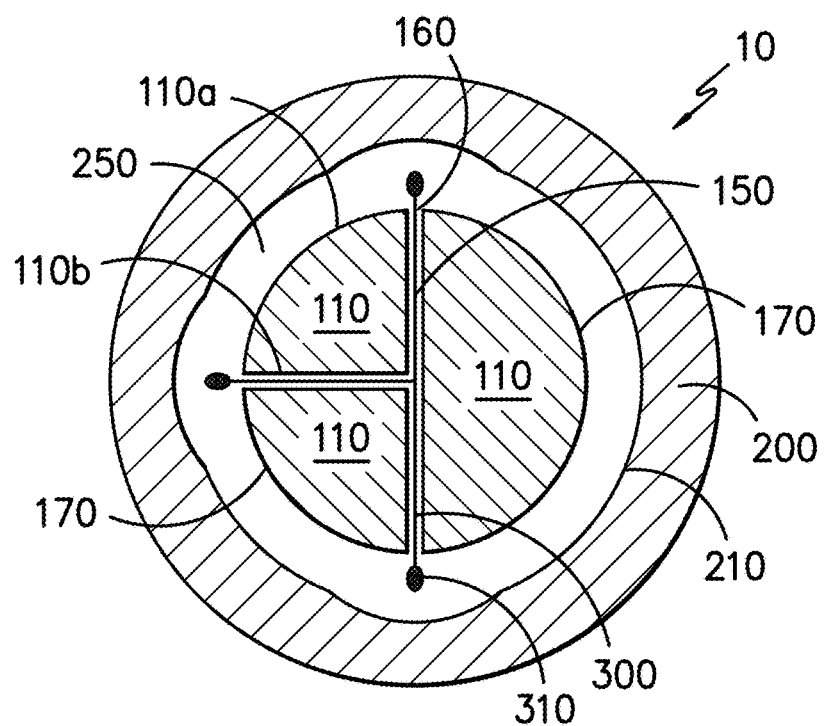
FIG. -3-
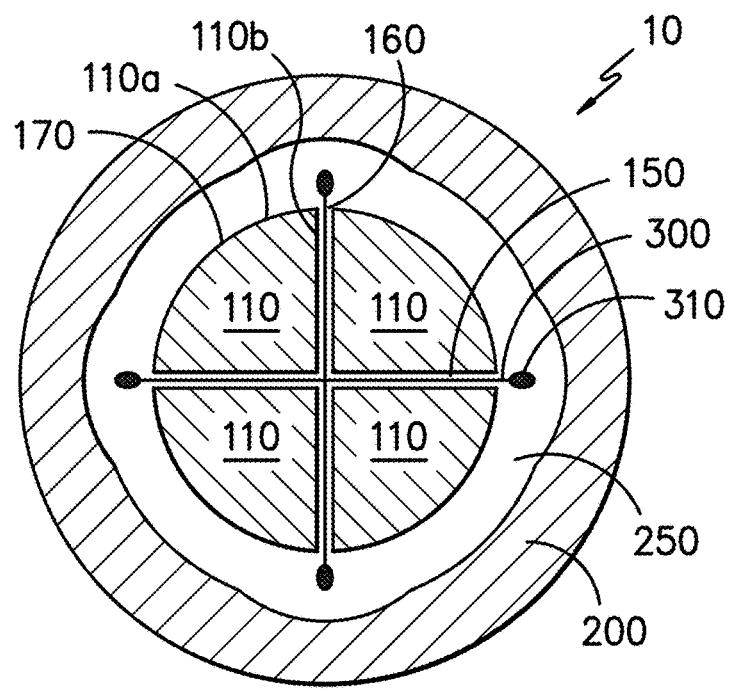
FIG. -4-

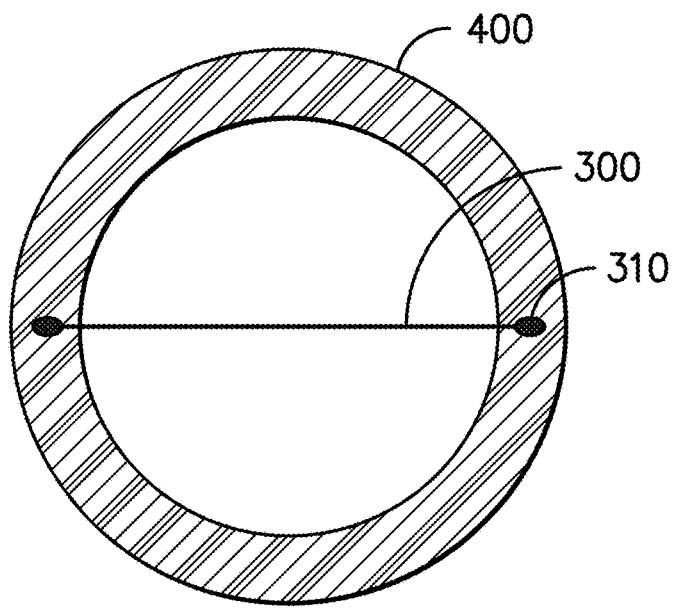
FIG. -5-
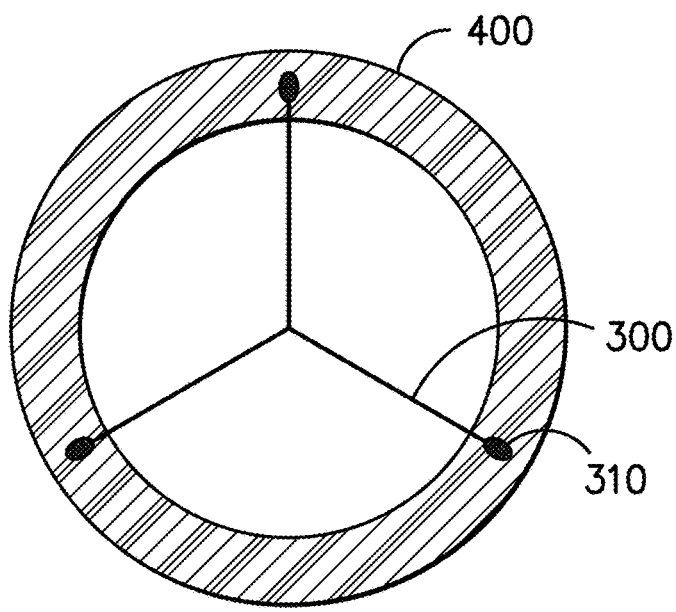
FIG. -6-

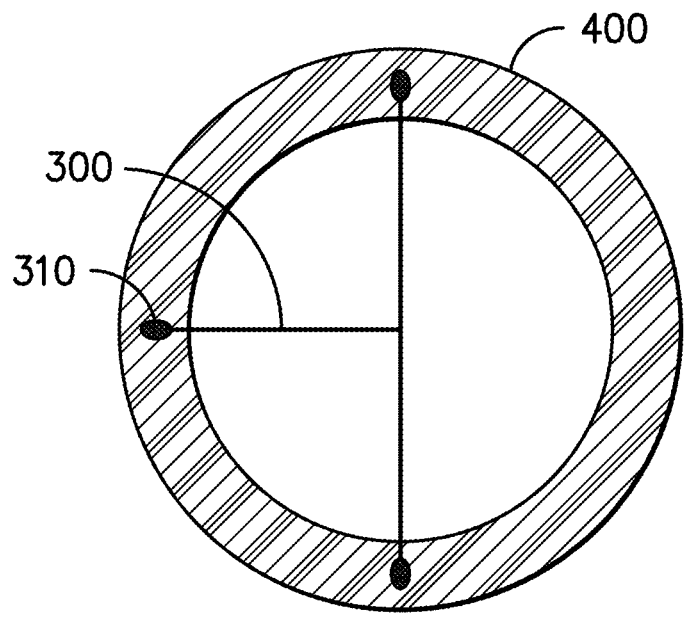
FIG. -7-
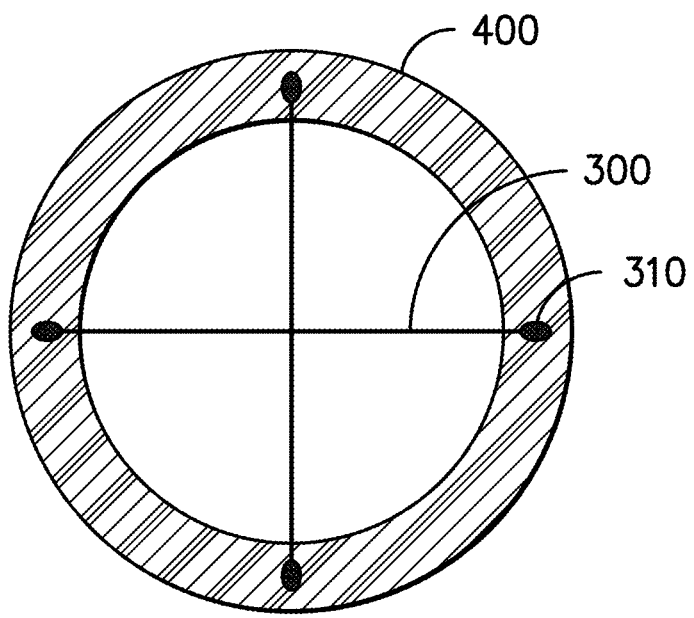
FIG. -8-

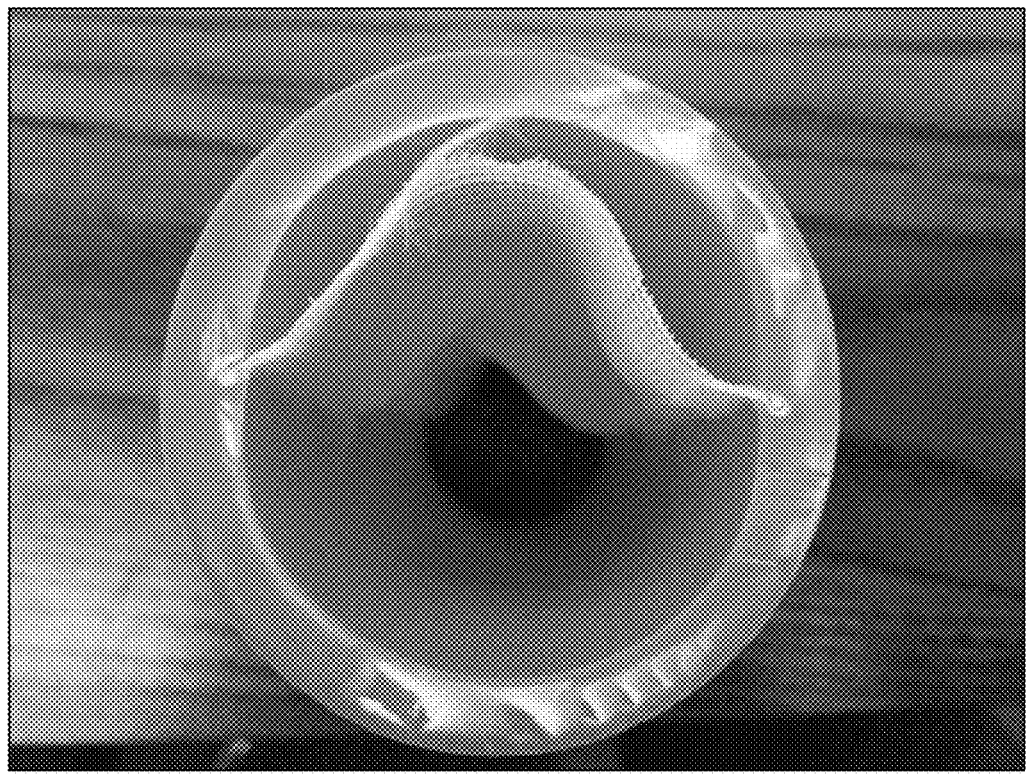
FIG. -9-

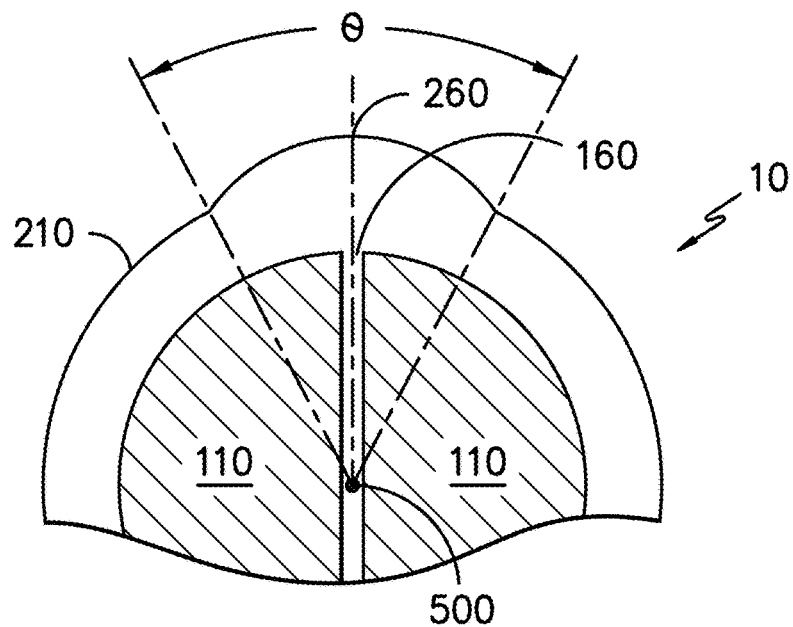
FIG. -10-
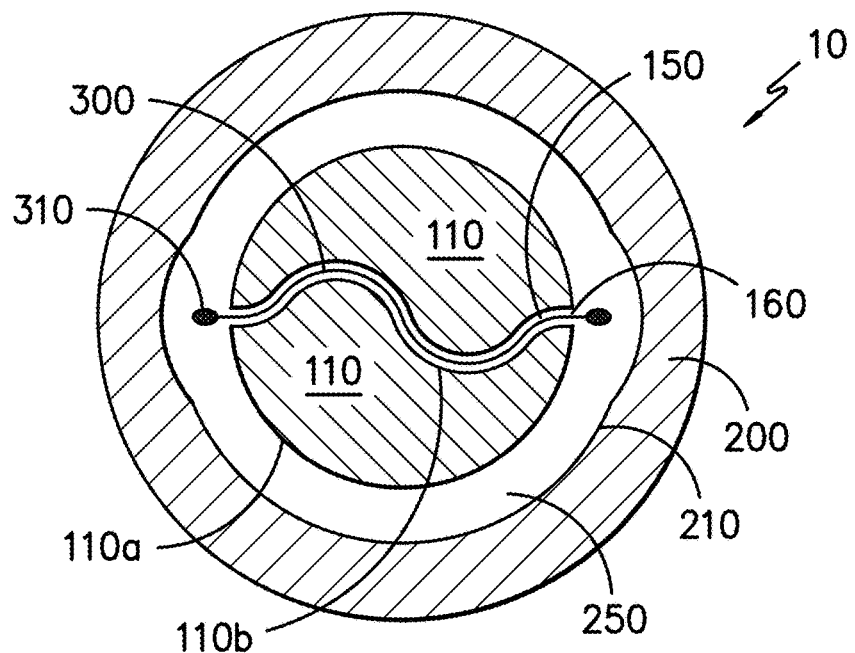
FIG. -11-

PROCESS FOR FORMING A DIVIDED CONDUIT

RELATED APPLICATIONS

This application claims priority to U.S. provisional application 62/364,626 filed on Jul. 20, 2016, which is herein incorporated by reference in its entirety.

TECHNICAL FIELD

The present disclosure generally relates to processes to form divided conduits into which cables, such as fiber optic cables, coaxial cables, and the like, may be positioned. More particularly, the present disclosure relates to processes to form divided conduits having a strip-shaped substrate embedded into a conduit and the extrusion die head to form the divided conduit.

BACKGROUND

Conduits for design to carry cable (for example, conduits that are buried in the ground), have specific physical requirements. One requirement is ovalization, a measure of how round, or oval the outer surface of a conduit is. Because conduits needs to be coupled together to form longer sections of conduit, the conduit must be able to fit into standard couplings. The mathematical equation for calculating ovalization is (OD stands for outer diameter):

$$((\text{Max OD}-\text{Min OD})/(\text{Max OD}+\text{Min OD}))\times 200$$

The industry standard is to have less than 7% ovalization. The typical method to correct ovalization in the industry is to extrude a thicker walled conduit and then stretch the conduit more down to the desired wall and outer diameter thickness.

In the case of a divided conduit, where a strip-shaped substrate is introduced into the conduit during extrusion (and therefore the edges of the strip-shaped conduit are embedded into the walls of the conduit), the addition of the fabric resulted in ovalization of greater than 7%. The standard ovalization industry fix did not improve the ovalization. Thus a need exists, for an extrusion die and a process to create a divided conduit having improved ovalization.

BRIEF SUMMARY

The application is directed towards a process for extruding a divided conduit. The process includes obtaining an extrusion die head, wherein the extrusion die head contains a tip region and a bushing region. The tip region contains at least two tips, where each tip has a cross-sectional shape with a curved portion and between 1 to 2 mating portions. The tips are oriented such that the mating portions of each tip are adjacent to the mating portions of adjacent tips and are separated by a distance defined to be a tip gap. The curved portions of the tips together in the tip region form a generally circular cross-sectional shape.

The bushing has an inner surface and the bushing extends around the tip region, with the distance between the tip region and the inner surface of the bushing is defined to be the die gap. The locations where the tip gap and the die gap intersect are defined to be the tip gap exits. The die gap has a first width measured at the tip gap exit locations and a second width measured at the midpoint between the tip gap exit locations. The first width is between about 10 and 75% larger than the second width;

The process includes forming a strip-shaped substrate having at least two longitudinal edges, where the substrate is selected from the group consisting of a strip-shaped textile and a strip-shaped film. The strip-shaped substrate varies in thickness along the width of the strip-shaped substrate, where the thickness is greatest at the longitudinal edges forming enlarged regions.

The process also includes inserting the strip-shaped substrate into the extrusion die head such that the strip shaped substrate is located within the tip gap and extends at least partially out of the tip gap such that the longitudinal edges are located in the die gap, flowing molten polymer through die gap, encapsulating the longitudinal edges of the strip-shaped substrate in molten polymer, and at least partially cooling and solidifying the molten polymer.

The application is also directed towards the extrusion die head.

BRIEF DESCRIPTION OF THE DRAWINGS

An exemplary embodiment of the present invention will now be described by way of example, with reference to the accompanying drawings, wherein:

FIG. 1 is a cross-sectional illustration of one embodiment of the invention having 2 tips in the tip region of the extrusion die head.

FIGS. 2 and 3 are a cross-sectional illustration of one embodiment of the invention having 3 tips in the tip region of the extrusion die head.

FIG. 4 is a cross-sectional illustration of one embodiment of the invention having 4 tips in the tip region of the extrusion die head.

FIGS. 5-8 are cross-sectional illustrations of divided conduits make from the extrusion die heads of FIGS. 1-4.

FIG. 9 is a photograph of a cross-section of a divided conduit.

FIG. 10 is an enlarged view of the extrusion die head of FIG. 1.

FIG. 11 is a cross-sectional illustration of one embodiment of the invention having 2 tips in the tip region of the extrusion die head.

DETAILED DESCRIPTION

The term "strip-shaped substrate" refers to a long strip of flexible material made of any suitable material such a textile or film. The term "longitudinal edges" refers to the edges along the length of the strip-shaped substrate. The term "longitudinal axis" refers to the axis of the strip-shaped substrate along its length. "Integral", in this application, means that two of more materials are connected with each other without the further use of any glues or adhesives. The divided conduit may be considered to be integral.

Referring now to FIG. 1, there is shown a cross-sectional illustration of one embodiment of the extrusion die head that forms the divided conduit. Extrusion die head 10 contains a tip region and a bushing 200.

The tip region can comprise any suitable number of tips 110 greater than 2. The tips are typically solid metal forms. The resultant divided conduit will contain the following number of cells (for cables and the like): number of tips minus one. FIG. 1 illustrates an extrusion die head 10 containing 2 tips 110. An illustration of a possible divided conduit containing the conduit 400 formed from the extrusion die head 10 of FIG. 1 is shown in FIG. 5. FIGS. 2 and 3 illustrate an extrusion die head 10 containing 3 tips 110. An illustration of possible divided conduits containing the conduit 400 formed from the extrusion die heads 10 of FIGS. 2 and 3 are shown in FIGS. 6 and 7 (respectively). FIG. 4 illustrates an extrusion die head 10 containing 4 tips 110. An illustration of a possible divided conduit containing the conduit 400 formed from the extrusion die head 10 of FIG. 4 is shown in FIG. 8. The tip region is not limited to 4 tips but may have 5, 6, 7, 10, or even more tips depending on the number of cells desired in the finished divided conduit.

Each tip 110 contains a curved portion and between 1 and 2 mating portions. The mating portions may be flat or curved. In the embodiment where the extrusion die head 10 contains 2 tips 100, each tip will have 1 curved portion and 1 mating portion. For the embodiments where the extrusion die head 10 contains 3 or more tips 100, each tip will have 1 curved portion and 2 mating portions. When the tips are combined into the tip region, the outer edges of the tip region (the curved portions) has a generally circular cross-sectional shape and form the inner surface of the divided conduit.

In the embodiments where the tips contain mating portions that are flat, the tips are shaped like pieces of pie cut from a cake and when the tips are combined into the tip region, the outer edges of the tip region (the curved portions) has a generally circular cross-sectional shape and form the inner surface of the divided conduit.

The mating portions of the tips are oriented such that the mating portions of each tip are adjacent to the mating portions of adjacent tips and are separated by a distance defined to be a tip gap 150. The tip gap 150 is where the strip-shaped substrate 300 is feed through the extrusion die head 10. In the embodiments where the tips contain mating portions that are flat, then the mating portions are preferably parallel and adjacent to the mating portions of adjacent tips.

As one can see from FIGS. 2-4, in the more complex set-ups of the tip region, multiple strip-shaped substrates may be combined together to form a shape that matches the shape of the tip gaps 150 formed by the tips 110. The tip gap width is determined by several factors including the thickness of the strip-shaped substrate 300 to be placed within the tip gap.

The tips 110 may be of equal size and shape as in, for example, FIG. 1 showing 2 tips with the same size and shape (each about 180 degrees of the circular cross-sectional shape). FIG. 2 shows the 3 tips 110 of equal size and shape (each about 120 degrees of the circular cross-sectional shape). FIG. 3 shows the 3 tips 110 of non-equal size and shape (two tips are about 90 degrees and one tip is about 180 degrees of the circular cross-sectional shape). Whether the tips are equally sized or not depends on the desired end product. FIG. 11 shows another embodiment of the extrusion die head 10 where the tip region contains 2 tips, each with 1 curved portion 110a and one mating portion 110b, where the mating portions are curved and mat with the adjacent tip to form the tip gap.

The extrusion die head 10 also contains a bushing 200. The bushing 200 completely surrounds the tip region and in the inner surface 210 of the bushing 200 forms the outer surface of the divided conduit. The bushing extends 360 degrees around the tip region in a spaced apart relationship, meaning that there is a gap, called the die gap, between the tips 110 and the inner surface 210 of the bushing 200.

The locations in the extrusion die head 10 where the tip gap and the die gap meet are called the tip gap exits 160. These tip gap exits 160 are located at the end of the tip gaps 150 where the mating portion and the curved portion of the tips meet.

A small radius of material from the inner surface 210 of the bushing 200 is removed at each location corresponding to a tip die exit. It has been found that this widening of the die gap at these locations corrects the ovalization of the conduit to form a conduit that meets and exceeds the tolerance parameters for the manufacture of the conduit.

The die gap is not a static width around the entire 360 degrees of the tip region and the inner surface of the bushing 200 is not a perfect circle. The die gap has a first width measured at the tip gap exit locations and a second width measured at the midpoint between the tip gap exit locations and the first width is preferably between about 10 and 70% larger than the second width, more preferably between about 20 and 50% larger.

The inner surface 210 of the bushing 200 has a plurality of non-circular cross-sectional regions, each being located and centered on a tip die exit location (meaning that half of the region is to one side of the tip die exit location transposed onto the inner surface 210 of the bushing and half of the region is on the opposite side). The non-circular cross-sectional regions preferably have a width of between about 10 and 135 degrees, more preferably between about 20 and 90 degrees, more preferably between about 30 and 60 degrees.

FIG. 10 is an illustration of a cross-section of an extrusion die head 10 having 2 tips zoomed in to show the detail of the non-circular cross-sectional regions. FIG. 10 shows one tip gap exit 160 and the corresponding location 260 on the inner surface 210 of the bushing 200 (the corresponding location is directly across the die gap from the tip gap exit location). The width of the non-circular cross-sectional region is measured from an angle formed by the locations on the inner surface 210 where the non-circular cross-sectional region begins and ends and the middle of the tip region (marked as 500 on the figure). The angle formed by these three points is ø and is preferably between about 10 and 135 degrees, more preferably between about 20 and 90 degrees, more preferably between about 30 and 60 degrees. This means that ø/2 is located to the right of the corresponding location 260 and ø/2 is located to the left of the corresponding location. Outside of non-circular cross-sectional regions, the inner surface 210 of the bushing 200 is generally circular.

A strip-shaped substrate 300 is formed and then fed into the extrusion die head 10. The strip-shaped substrate 300 may be formed of any suitable material. The strip-shaped substrate should be flexible, preferably have a low coefficient of friction to avoid cable damage and preferably have a high strength to avoid tearing during cable installation. In one embodiment, the strip-shaped substrate should be able to withstand the extrusion temperatures of the thermoplastic polymer used to form the conduit.

Preferably, the coefficient of friction for the strip-shaped substrate (dynamic or sliding coefficients of friction) are between about 0.06 to about 0.14, and a narrower range of about 0.08 to about 0.13, may also be used. In one embodiment, the breaking tensile strength of the present fabric is in the range of from about 45 kg/cm to about 70 kg/cm. In another embodiment, the elongation percentages of the strip-shaped substrate are between 2% and 5% at 22.5 kg of force and between 5% and 10% at 45.5. Kg of force. The strip-shaped substrate preferably has a thickness of about 0.025 inches to 0.100 inches. The strip-shaped substrate preferably has a breaking strength of about 200 lbs/cm to 600 lbs/cm. In one embodiment, the strip-shaped substrate has air permeability of 10 $cm^3/cm^2/s$ to 70 $cm^3/cm^2/s$. In other embodiments, the strip-shaped substrate could have low to no air permeability. Preferably the strip-shaped substrate has a rigidity of between about 100 and 400 grams force as measured by ASTM D6827.

In one embodiment, the strip-shaped substrate 300 is a strip-shaped textile. The strip-shaped textile used may be any suitable textile, but is preferably one that is flexible, has a low coefficient of friction, high melting point, and a high tensile strength. The textile may be a knit, woven, nonwoven, or unidirectional. The strip-shaped textile may have additional function chemistries such as low friction, fire resistance, adhesion, or color added. The chemistries may be added to the yarns during yarn formation or applied onto the yarns before or after textile formation. In one embodiment, the textile has a weight of about 2 to 20 ounces per yard and in another embodiment has a weight of about 10 to 12 ounces per yard. The space between the yarns within the textile will aid in breathability of the textile and the flexibility of the divided conduit. Further, having these shapes should allow for easier movement of the strip-shaped textile within the divided conduit to change the size of the channels and make it easier to install cables in between empty channels.

In one embodiment, the strip-shaped textile is a woven textile. The fabric base may also be, for example, plain, satin, twill, basket-weave, poplin, jacquard, and crepe weave textiles. Preferably, the woven textile is a plain weave textile. It has been shown that a plain weave has good abrasion and wear characteristics. A twill weave has been shown to have good properties for compound curves so may also be preferred for some strip-shaped textiles. The end count in the warp direction is between 35 and 70 in one embodiment. The denier of the warp yarns is between 350 and 1200 denier in one embodiment. In one embodiment, the textile is air permeable which increases the flexibility of the divided conduit and may allow for easier movement of the strip-shaped textile within the divided conduit to change the size of the channels and make it easier to install cables in between empty channels. In another embodiment, the textile is non-air permeable allowing for the blowing in of cables into the divided conduit.

In another embodiment, the strip-shaped textile is a knit, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the strip-shaped textile is a multi-axial, such as a tri-axial fabric (knit, woven, or non-woven). In another embodiment, the strip-shaped textile is a bias fabric. In another embodiment, the strip-shaped textile is a non-woven. The term non-woven refers to structures incorporating a mass of yarns that are entangled and/or heat fused so as to provide a coordinated structure with a degree of internal coherency. Non-woven fabrics for use as the strip-shaped textile may be formed from many processes such as for example, meltspun processes, hydroentangeling processes, mechanically entangled processes, stitch-bonded and the like. In another embodiment, the strip-shaped textile is a unidirectional textile and may have overlapping yarns or may have gaps between the yarns.

The yarns making up the strip-shaped textile forming the strip-shaped substrate 300 may be any suitable yarn. "Yarn", in this application, as used herein includes a monofilament elongated body, a multifilament elongated body, ribbon, strip, fiber, tape, and the like. The term yarn includes a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

Some suitable materials for the yarns include polyamide, aramid (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic, polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6); regenerated cellulosics (such as rayon or Tencel); elastomeric materials such as spandex; high-performance fibers such as the polyaramids, and polyimides natural fibers such as cotton, linen, ramie, and hemp, proteinaceous materials such as silk, wool, and other animal hairs such as angora, alpaca, and vicuna, fiber reinforced polymers, thermosetting polymers, blends thereof, and mixtures thereof.

In one embodiment, the yarns of the textile have a greater melting temperature than the thermoplastic polymer forming the conduit so they will not melt during the extrusion process forming the divided conduit. In another embodiment, the yarns do not have a melting temperature (such as yarns from a thermoset polymer or some natural fibers), but must be able to withstand the extrusion conditions of the conduit without significant loss in physical properties.

In one embodiment, the textile contains warp yarns and weft yarns which are monofilament. In another embodiment, the warp yarns are monofilament and the weft yarns are multi-filament. In another embodiment, the warp yarns are monofilament and the weft yarns are an alternating arrangement of monofilament and multifilament yarns. In another embodiment, the warp yarns and weft yarns are multifilament. In another embodiment, the warp yarns are multifilament. In another embodiment, the warp yarns are multifilament and the filling yarns are monofilament. The phrase "alternating arrangement" refers to a repeating pattern of monofilament to multifilament yarns. In one embodiment, the arrangement of monofilament to multifilament yarns is 1:1. Other ratios, such as 1:2, 1:3, 2:3, 3:4, or 3:5, for example, may also be employed, as product specifications dictate. For the embodiments containing monofilament yarns, the denier of the yarns is preferably between about 200 and 800 denier. For the embodiments containing multifilament yarns, the denier of the yarns is preferably between about 200 and 1,000 denier.

The strip-shaped substrate 300 may also be a strip-shaped film. Preferably, this film is made of a thermoplastic polymer, but may also be made of any other suitable material including a thermoset. Some suitable thermoplastic polymers include, but are not limited to polypropylene, polyethylene, polyester, polyvinyl alcohol, blends thereof, and co-polymers thereof. Preferably, the film is formed from a thermoplastic selected from the group consisting of polyester, polyolefin, and polyamide. The strip-shaped film may have perforations or be continuous. Perforations will aid in breathability of the film and the flexibility of the divided conduit. Further, having perforations should allow for easier movement of the strip-shaped film within the divided conduit to change the size of the channels and make it easier to install cables in between empty channels. Further, the strip-shaped film may be fiber reinforced or not. A film containing fibers may increase the breaking strength of the film. In one embodiment, at least one of the surfaces of the strip-shaped film has a textured surface. One example of a textured surface is an "orange peel" finish. This textured surface may serve to reduce the coefficient of friction and allow for easier insertion of cables or other elongated structures.

In some embodiments, an already formed, free-standing strip-shaped film is inserted into the conduit during the formation of the divided conduit. In one embodiment, this strip-shaped film is oriented, meaning that after extrusion the film is further stretched in at least one axis. This orienting serves to increase the dimensional stability and strength of the film to be placed into the conduit. In one embodiment, the polymer that the film is made of has a higher melting temperature than the polymer used to form the conduit. In another embodiment, the film does not have a melting temperature (such as thermoset polymer). In this embodiment, the film must be able to withstand the extrusion conditions of the conduit without significant loss in physical properties. The strip-shaped film may have chemistries added to the polymer before film formation or applied onto the formed film to provide for low friction, fire resistance, adhesion, or color. The film may contain a bumpy finish to reduce the amount of contact the film has with the cable, pull line, or other elongated structure.

In some die designs, because the molten polymer (which forms the conduit walls) is under pressure it may push the substrate from the tip gap exit 160, towards the center of the tip region causing jamming in the die and other undesirable effects. One way to lessen or eliminate this is to have the strip-shaped substrate 300 contain enlarged regions 310 at or near the edge of the substrate such that the substrate 300 stays in the gap and does not bunch up.

The enlarged regions 310 of the substrate 300 may be formed in any suitable manner with any suitable material. Preferably, the enlarged regions 310 are located at the very edge or along the edge of the substrate 300. In one embodiment, the enlarged regions are not located right at the edge but at a distance from the edge (in one embodiment less than 20 millimeters from the edge). In another embodiment, the enlarged region 310 is less than 10 millimeters wide, preferably less than 5 millimeters wide, more preferably less than 3 millimeters wide. While the enlarged region 310 is shown as having an oblong shape in some of the Figures, any suitable cross-sectional shape may be used.

In one embodiment, the enlarged region 310 of the substrate 300 is formed from folding over the edge of the substrate 300 and stitching on the fold. This embodiment has the advantage of securing the substrate (if it is a textile) from fraying along the edge. In another embodiment, stitches are added along the edges (or near the edges) to create an enlarged region. In another embodiment, a polymer is extruded onto the edges of the substrate 300 to build up the edge and create the enlarged region 310. The substrate 300 may also be crimped (mechanically or ultrasonically) or have other materials added to the edges of the substrate 300 to form the enlarged regions 310. When additional material is added to the substrate 300 to form the enlarged regions 310, the material preferably has a melting temperature higher than the melting temperature of the polymer forming the conduit walls so as to prevent or lessen any melting of the material as the substrate 300 passes through the extrusion die. In another embodiment, the enlarged regions 310 of the substrate 300 are ultrasonically sealed. In another embodiment, the edge of the fabric is folded over onto itself and is ultrasonically sealed and attached to itself. This may be preferred for some embodiments as it finishes the edge of the substrate (in the case of a textile it helps prevent fraying) and is a cost efficient manner of attaching the substrate to itself to build thickness in the enlarged regions of the substrate.

In one embodiment, a material (polymer, thread, etc.) is added to an existing substrate 300 to create the enlarged region 310. In another embodiment, the substrate 300 is formed having enlarged regions. In the case of the substrate being a film, one way for this to occur would be to extrude a substrate having beads at the edges or a thickness variation across the film. In the case of the substrate being a textile, one way for this to occur would be to weave a substrate having substantially thickness fibers or yarns in the areas of the textile which form the edges of the substrate 300.

The enlarged regions 310 of the substrate have a greater thickness that the middle section of the substrate. In one embodiment, the thickness chance between the enlarged regions 310 to the rest of the substrate is a step function, meaning that the substrate goes almost immediately from one thickness to the other. In another embodiment, the thickness change between the enlarged region 310 and the rest of the substrate 300 is a gradient or gradual change in thickness. In one embodiment, the thickness of the enlarged regions of the strip-shaped substrate are at least 1.1 times the thickness of the regions of the strip-shaped substrate outside of the enlarged regions, more preferably at least 1.2, more preferably at least 1.5, more preferably at least 2 times, more preferably at least 2.25 times thicker. In one embodiment, the tolerance between the substrate and the slot are tight enough that a small change in the thickness of the substrate in the enlarged regions of the fabric will be enough to prevent (or minimize) the ends of the fabric getting pushed towards the middle of the slot by the high pressure of the melt in the die gap.

The shape and size of the strip-shaped substrate 300 is selected to match with the extrusion die head 10 configuration. If the die head contains 2 tips 110, then preferably, the strip-shaped substrate is a narrow strip between about 32 and 60% of the inner circumference of the conduit. In other embodiments where more than 2 tips are used, the strip-shaped substrate is preferably a compound strip-shaped substrate, meaning that two or more substrates are joined together to form the strip-shaped substrate for that die head. In FIGS. 2 and 3, where there are 3 tips used in the die 10, the strip-shaped substrate 300 is preferably formed from one full width strip and one approximately half width strip that is attached to the mid-point line of the full width strip. In FIG. 4, where there are 4 tips used in the die 10, the strip-shaped substrate 300 is preferably formed from two full width strips that are attached at their mid-point lines to one another. The larger the number of tips, the more complex the strip-shaped substrate would be. The strips may be attached to one another using any suitable means such as adhesive, ultrasonic welding, stitching, or may be formed as a unitary structure (for example extruding a film having the desired shape).

The strip-shaped substrate 300 is inserted into the extrusion die head 10 such that the strip shaped substrate 300 is located within the tip gap 150 and extends at least partially out of the tip gap 150 (from the tip gap exits 160) such that the enlarged edges 310 are located in the die gap 250. Molten polymer flows through the die gap 250 and completely covers, surrounds, and embeds the enlarged edges of the strip-shaped substrate 300. Being "embedded" means that the edges of the strip-shaped substrate are not just adhered to the surface of the inner surface of the conduit wall but wall by actually reside within the wall of the conduit such that the edge is completely covered, surrounded, and encapsulated by the material of the conduit.

The molten polymer is flowed through die gap 250, encapsulating the longitudinal edges of the strip-shaped substrate in molten polymer, then the molten polymer (and the embedded strip-shaped substrate) exits the die 10 and the molten polymer is at least partially cooled and solidified.

The polymer used to create the divided conduit walls may be any suitable material. In one embodiment, the conduit walls are formed from a polymer selected form the group consisting of polyethylene, polypropylene, polyester, and polyvinyl chloride. The conduit may contain a bumpy finish to reduce the amount of contact the film has with the cable, pull line, or other elongated structure. In one embodiment, the inner or outer surface of the conduit has a textured surface. One example of a textured surface is an "orange peel" finish, where the texture resembles the bumpy surface of the skin of an orange (fruit). This textured surface may serve to reduce the coefficient of friction and allow for easier insertion of cables or other elongated structures. The conduit may be smooth-wall, corrugated, or the like.

The divided conduit (also sometimes referred to as a pipe or tube), may have any suitable wall thickness, inner diameter, and outer diameter. Conduits for use in the fiber optic field tend to have an inner diameter of about 12 mm to 50 mm. In other embodiments, the conduit may have a very large inner diameter, for example from about 100 mm to 150 mm, or may have a very small diameter such as less than about 50 mm. In another embodiment, the conduit may have an inner diameter of between about 50 and 100 mm. The conduit is preferably flexible. A picture of a finished divided conduit (which was formed from a die having two tips) can be seen in FIG. 9.

The divided conduit may optionally contain pull lines or cords. These may be placed inside the conduit in at least one channel during manufacture of the divided conduit, after conduit formation, or after conduit placement. Pull lines, which are typically tightly woven, relatively flat strips of material, may be used for pulling cables through the channels. However, pull cords having a substantially round cross-section may be used successfully with smaller diameter cables.

In one embodiment, the pull lines are formed of woven, polyester material (for example circular woven or woven round rope), which exhibits a tensile strength of between about 400 pounds and about 3,000 pounds. In an alternate embodiment, a twisted round rope (for example, a multi-ply cord) may be used, where such pull cords are made of polypropylene, polyester, and the like.

The divided conduit is designed to contain cables or other elongated objects. These may be placed inside the conduit in at least one channel during manufacture of the divided conduit, after conduit formation, or after conduit placement.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for extruding a divided conduit comprising:
   obtaining an extrusion die head comprising:
      a tip region comprising at least two tips, wherein each tip has a cross-sectional shape comprising a curved portion and between 1 to 2 mating portions, wherein the tips are oriented such that the mating portions of each tip are adjacent to the mating portions of adjacent tips and are separated by a distance defined to be a tip gap, and wherein the curved portions of the tips together in the tip region form a generally circular cross-sectional shape; and,
      a bushing having an inner surface, wherein the bushing extends around the tip region, wherein the distance between the tip region and the inner surface of the bushing is defined to be the die gap, and therein the locations where the tip gap and the die gap intersect are defined to be the tip gap exits, wherein the die gap has a first width measured at the tip gap exit locations and a second width measured at the midpoint between the tip gap exit locations, wherein the first width is between about 10 and 75% larger than the second width;
   forming a strip-shaped substrate having at least two longitudinal edges, wherein the substrate is selected from the group consisting of a strip-shaped textile and a strip-shaped film, wherein the strip-shaped substrate varies in thickness along the width of the strip-shaped substrate, wherein the thickness is greatest at the longitudinal edges forming enlarged regions;
   inserting the strip-shaped substrate into the extrusion die head such that the strip shaped substrate is located within the tip gap and extends at least partially out of the tip gap such that the longitudinal edges are located in the die gap;
      flowing molten polymer through the die gap, encapsulating the longitudinal edges of the strip-shaped substrate in molten polymer; and, at least partially cooling and solidifying the molten polymer;

wherein the inner surface of the bushing extends 360 degrees around the tip region, wherein the inner surface of the bushing comprises non-circular cross-sectional regions corresponding to the tip gap exit locations and have a width of between 10 and 135 degrees centered on the tip gap exit.

2. The process for extruding a divided conduit of claim 1, wherein the tip region comprises 2 tips and each tip comprises a curved portion and a mating portion.

3. The process for extruding a divided conduit of claim 1, wherein the tip region comprises 3 tips and each tip comprises a curved portion and two mating portions.

4. The process for extruding a divided conduit of claim 1, wherein the tip region comprises 4 tips and each tip comprises a curved portion and two mating portions.

5. The process for extruding a divided conduit of claim 1, wherein the second width is between about 20 and 50% larger than the first width.

6. The process for extruding a divided conduit of claim 1, wherein at least one of the mating portions is flat.

7. The process for extruding a divided conduit of claim 1, wherein the regions of the inner surface of the bushing outside of the non-circular cross-sectional regions have a generally circular cross-sectional shape.

8. The process for extruding a divided conduit of claim 1, wherein the inner surface of the bushing comprises non-circular cross-sectional regions corresponding to the tip gap exit locations and have a width of between 20 and 90 degrees centered on the tip gap exit.

9. The process for extruding a divided conduit of claim 1, wherein the inner surface of the bushing comprises non-circular cross-sectional regions corresponding to the tip gap exit locations and have a width of between 30 and 60 degrees centered on the tip gap exit.

* * * * *